A. SCHMITTER.
Caliper.
No. 207,308. Patented Aug. 20, 1878.
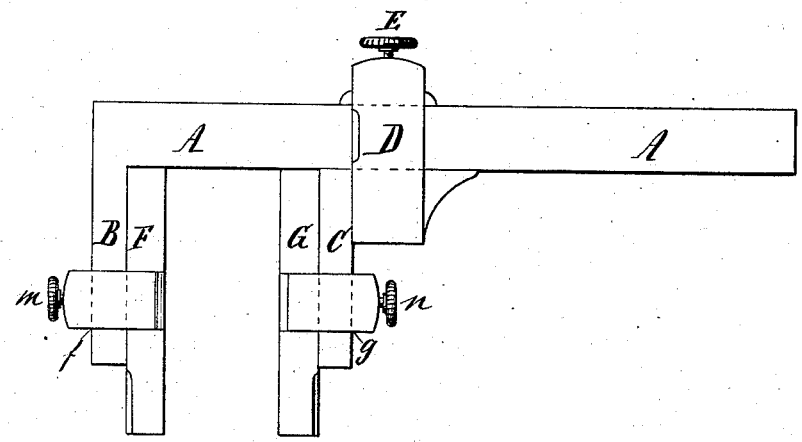
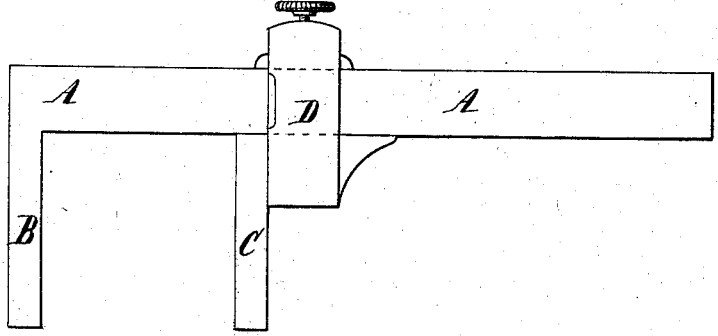
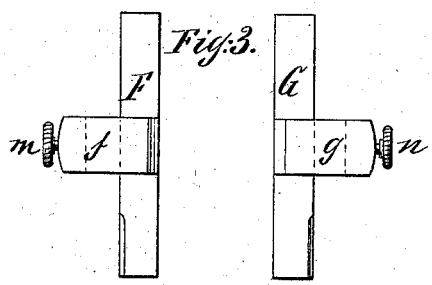
Witnesses:
Wm Kastenhuber
E A Stent
Inventor,
Anton Schmitter
per Ernst Bilhuber,
his Atty.

UNITED STATES PATENT OFFICE.

ANTON SCHMITTER, OF PATERSON, NEW JERSEY.

IMPROVEMENT IN CALIPERS.

Specification forming part of Letters Patent No. 207,308, dated August 20, 1878; application filed July 23, 1878.

*To all whom it may concern:*

Be it known that I, ANTON SCHMITTER, of Paterson, in the county of Passaic and State of New Jersey, have invented a new and useful Improvement in Calipers, of which the following is a specification:

The invention relates to sliding scales for inside and outside calipering.

Heretofore sliding calipers have been so arranged that the slide had to be moved when it was desired to set the instrument for an inside dimension equal to an outside dimension previously measured by the instrument.

The object of my invention is to provide means for changing the caliper from inside to outside without changing the position of the slide.

This invention consists in two caliper-fingers for inside calipering, which are removably attached to the caliper-jaws for outside calipering in such a manner that the inside faces of the jaws are exactly in line with the outside faces of the fingers for inside calipering.

In the accompanying drawing, in which similar letters of reference indicate like parts, Figure 1 represents the caliper with the fingers attached for inside calipering. Fig. 2 shows the instrument for outside calipering with the fingers removed. Fig. 3 shows the fingers separate.

The instrument, as represented in Fig. 2, is of the usual construction, A being the scale, B the fixed jaw, C the movable jaw attached to the slide D, which is fixed in any desired position by the set-screw E. F and G are the fingers, which, by means of the hollow guides $f$ and $g$ and the set-screws $m$ and $n$, are clamped to the jaws B and C in such a manner that the outer faces of the fingers are in line with the inner faces of the jaws. The fingers F and G are reversible, the outer face of one end being, by preference, flat for measuring the inner distance of parallel flat faces, while the outer face of the other end is rounded or tapered off for measuring round holes.

After any measurement of an inside dimension has been taken by this instrument it is readily set for taking the corresponding outside dimension, and vice versa, without moving the slide.

The instrument may be made with adjusting-screws, and with vernier in the usual manner.

What I claim is—

A caliper provided with the removable fingers F G, the outer faces of which are adapted to rest against and stand in line with the inner faces of fingers B C, whereby an outer dimension and corresponding inner dimension may be taken or tested without moving the slide, substantially as described.

ANTON SCHMITTER.

Witnesses:
 WILLIAM S. HURD,
 FREDERICK BUCKLEY.